(12) United States Patent
Agrawal et al.

(10) Patent No.: US 7,761,479 B2
(45) Date of Patent: Jul. 20, 2010

(54) MANAGEMENT OF COMPLEX XML SCHEMAS IN A DATABASE SYSTEM

(75) Inventors: Abhyudaya Agrawal, San Francisco, CA (US); Thomas Baby, Foster City, CA (US); Ravi Murthy, Fremont, CA (US); Nipun Agarwal, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 235 days.

(21) Appl. No.: 11/519,720

(22) Filed: Sep. 11, 2006

(65) Prior Publication Data
US 2008/0065654 A1 Mar. 13, 2008

(51) Int. Cl.
G06F 7/00 (2006.01)
G06F 17/00 (2006.01)
(52) U.S. Cl. .................................. 707/803; 707/954
(58) Field of Classification Search .......... None
See application file for complete search history.

(56) References Cited

U.S. PATENT DOCUMENTS

| | | | |
|---|---|---|---|
| 6,502,101 B1 * | 12/2002 | Verprauskus et al. | 707/101 |
| 2003/0065662 A1 * | 4/2003 | Cosic | 707/9 |
| 2004/0083218 A1 * | 4/2004 | Feng | 707/100 |
| 2004/0093344 A1 * | 5/2004 | Berger et al. | 707/102 |
| 2006/0212800 A1 * | 9/2006 | Kamiya | 715/513 |

OTHER PUBLICATIONS

Gicqueau, Ale, Business Development Manager, "Importing XML documents to Relational Databases using Java," 2003, HiT Software.*
Bohannon et al., "From XML Schema to Relations: A Cost-Based Approach to XML Storage," IEEE, 2002.*
Lui et al., "On Transformation to Redundancy Free XML Schema from Relational Database Schema," Springer-Verlag Berlin Heidelberg, 2003.*

* cited by examiner

Primary Examiner—Pierre M Vital
Assistant Examiner—Rachel J Lee
(74) Attorney, Agent, or Firm—Hickman Palermo Truong & Becker LLP; Deborah L. Caswell (57) ABSTRACT

Techniques manage the presence of repeated constructs within a complex type at the time of schema registration. At registration, techniques detect repeated elements in the XML schema and analyze whether the repeated elements are from the same complex type. If so, techniques perform additional analysis to determine a minimal common ancestor. Within the context of a minimal common ancestor, techniques determine the maximum number of times an element may occur in the schema. In a choice content model, the largest maximum occurrence value is selected. In other content models, the maximum occurrence value is determined by adding together the occurrence values for the repeated elements. Then, when an object relational table is generated for the XML schema, the maximum number of times that an element appears in the schema is this value. Techniques retain the advantages of object relational storage, even after a schema evolution.

34 Claims, 6 Drawing Sheets

```
<complexType name="AType">
    <sequence>                                    108
        <choice>                                             104
            102  <element name="ChildZero" type="string"/>
            103  <element name="ChildOne" type="string"/>
        </choice>
        <choice>                                             107
            105  <element name="ChildOne" type="string"/>
            106  </element name="ChildTwo" type="string"/>
        </choice>
    </sequence>
</complexType>
```

```
<complexType name="AType">
    <all>                                         115
        <choice>
            <element name="ChildZero" type="string"/>
            111  <element name="ChildOne" type="string"/>
        </choice>

<choice>
            112  <element name="ChildOne" type="string"/>
            </element name="ChildTwo" type="string"/>
        </choice>
    </all>
</complexType>
```

FIG. 1B

```
<complexType name="AType">
    <choice>                            125
        <choice>
            <element name="ChildZero" type="string"/>
            121 <element name="ChildOne" type="string"/>
        </choice>

<choice>
            122  <element name="ChildOne" type="string"/>
            </element name="ChildTwo" type="string"/>
        </choice>

</choice>
</complexType>
```

```
<complexType name="AType">
    <sequence>

<choice>
            <element name="ChildZero" type="string"/>
            131  <element name="ChildOne" type="string"  maxOccurs="5" />
        </choice>

<choice>
            132   <element name="ChildOne" type="string"/>
            </element name="ChildTwo" type= "string" maxOccurs="7" />
        </choice>

</sequence>
</complexType>
```

```
                                            ← 140

<complexType name="Parent_AType">  141
    <choice>
        <element name="ChildZero" type="string"/>           143
        <element name="ChildOne" type="string" maxOccurs="5"/>    144
    </choice>
</complexType>

<complexType name="Child_AType">  142
    <complexContent>
        <extension base="Parent_AType">
            <choice>
                145    <element name="ChildOne" type="string" maxOccurs="7"/>
                146    <element name="ChildTwo" type="string"/>
            </choice>
        </extension>
    </complexContent>
</complexType>
```

MANAGEMENT OF COMPLEX XML SCHEMAS IN A DATABASE SYSTEM

RELATED APPLICATIONS

The present application is related to U.S. patent appplication Ser. No. 11/521,907 filed by Baby, et al. on Sep. 15, 2006, entitled "EVOLUTION OF XML SCHEMAS INVOLVING PARTIAL DATA COPY," which is incorporated by reference in its entirety for all purposes as though fully and originally disclosed herein.

The present application is related to U.S. patent application Ser. No. 11/540,341 filed by Agrawal, et al. on Sep. 28, 2006, entitled "IMPLEMENTATION OF BACKWARD COMPATIBLE XML SCHEMA EVOLUTION TN A RELATIONAL DATABASE SYSTEM," which is incorporated by reference in its entirety for all purposes as though fully and originally disclosed herein.

This application is related to U.S. patent application Ser. No. 10/259,278, entitled "MECHANISM FOR MAPPING XML SCHEMAS TO OBJECT-RELATIONAL DATABASE SYSTEMS", filed by Ravi Murthy et al. on Sep. 27, 2002, the entire contents of which is hereby incorporated by reference for all purposes as if fully set forth herein.

Background

An XML schema in an XML-type database defines the structure of instance XML documents inserted into a database. Instance XML documents are XML documents inserted into the XML-type database that conform to the XML schema. The database structures of a database representation of an XML schema are referred to herein as "base database structures." Base database structures include, for example, table columns that each represent an element of an XML schema or object type tables whose object type attributes correspond to elements of the XML schema.

After registration, the XML schema indicates the data type of items in instance XML documents. The data types of items that appear in an instance XML document range from simple types to complex types. A "complex type" in XML is a construct that includes other defined elements and/or attributes. For example, an XML schema may define an Address complex type. Within the Address complex type, various elements such as street name, city, state, and zip code can be defined and assigned a corresponding data type (e.g., street and city are string values and state a constant two-letter value). In addition, within the complex type, a developer can define a content model for the complex type. A "content model" is an XML construct that defines the order and behavior elements can appear in an instance XML document. The three main content models are: "sequence", "choice", and "all".

A sequence model defines of an ordered set of elements within a complex type. This means that for each element listed in a sequence model in an XML schema, there is a corresponding element in each instance XML document listed in the same order as the element is listed in the XML schema. For example, in the Address example, assume the complex type implements a sequence content model and defines the elements street name, city, state, and zip. Accordingly, each instance XML document of type Address must include a value for street name, city, state, and zip, in that order. Otherwise, the instance XML document does not conform to the defined sequence content model.

The choice content model provides a mechanism for selecting one of several options. Thus, in an instance XML document, only one sub-element (or child element) of the choice content model can be selected. For example, suppose the Address complex type above is defined with a choice content model. The corresponding instance XML documents will only list one of the Address's child elements, e.g., only one of street name, city, state, or zip.

Note that in the XML schema, when defining a sequence or choice content model, additional attributes can be set on a child element to designate the minimum and/or maximum number of times the child element may occur in an instance XML document. For example, a user may use commands such as "minOccurs" and "maxOccurs" to define the number of times a child element can appear in an instance XML document. Although, unless, the default value for the number of occurrences of a child element is one.

The last of the three content models is the "all" content model. It indicates that a corresponding instance XML document includes each of the child elements of a complex type once and only once. However, the child elements may appear in any order. Because of the constraints on what the all content model does, the maximum number of occurrences of a child element is always set to one, and the minimum is set to either zero or one. By default, the minimum and maximum occurrence values in the all content model are set to one.

In XML schemas, a reoccurring problem is the presence of two or more schema constructs having elements with the same name in the same XML complex type. XML database systems are not designed to handle repeated elements within the same complex type. For example, in the Address example, if there were two schema constructs (inherited or otherwise) with the same defined "street name" elements, then an error would occur. The error occurs because the XML database system would not be able to create the corresponding base database structures for those elements in the schema. Basically, two columns in an object relational table from the same complex type cannot have the same name. Accordingly, conventional XML database systems raise errors when a user attempts to register a schema containing repeated elements in a complex type. This same problem can occur even after a schema has been registered (e.g., the user attempts to update the schema.

Accordingly, there is a need for techniques to handle the presence of two or more same named constructs within a complex type. Moreover, the techniques should retain the advantages of object relational storage, even after a schema evolution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Techniques are described herein to manage XML schemas that include complex types. More particularly, the techniques described herein manage the presence of repeated constructs within a complex type at the time of registration of the schema that includes the complex type. In one embodiment, registering a schema involves inserting an XML schema document into an XML-type database system. Alternatively, the schema may be registered in other ways, such as executing a series of CREATE commands.

In one embodiment, the techniques manage the presence of repeated constructs in an XML schema as the schema is registered in the XML-type database system. At the time of registration, a mechanism detects repeated elements in the XML schema and analyzes whether the repeated elements are from the same complex type. If the repeated elements are from the same complex type, then the database system performs additional analysis to determine a minimal common ancestor for the two repeated elements. Within the context of the minimal common ancestor, the database system then determines the maximum number of times an element may occur in the schema.

Accordingly, when the base database structures are generated for an XML schema, the maximum number of times that an element can appear in a given complex type is used to determine how to define the base database structures. For example, if the maximum number of times an element can appear is more than one, the base database structure for that element is defined as a collection type. Alternatively, if the maximum number of times an element can appear is one, then the base database structure for the given element is of a scalar type. Thus, the base database structures can be appropriately defined at the time the XML schema is registered and/or updated.

Using the techniques described herein, the database system retains the advantages of object relational storage, even after a schema evolution.

Registration of Repeated Elements in a Complex Type

In one embodiment, the process of populating a database with instance XML documents involves first designing the XML schema and registering it with an XML database system. When an XML schema is registered with a database system, elements and attributes from the XML schema are extracted and used to define base database structures for the corresponding XML-type database.

For example, in one embodiment, registering an XML schema with a XML-type database system creates an object-relational table that includes a column for each defined element in the XML schema. Then, instance XML documents conforming to the schema may be uploaded and stored in the corresponding object-relational table.

Assume, in an embodiment, during the registration process, the database system detects that a complex type within the XML schema includes repeated (or repeated) elements. Conventionally, XML-type database systems would indicate that there was an error in the schema because a complex cannot create two base database structures of the same type with the same name. According to an embodiment, the database system employs mechanisms to overcome the problems associated with the repeated elements in a complex type.

Figure 1A:
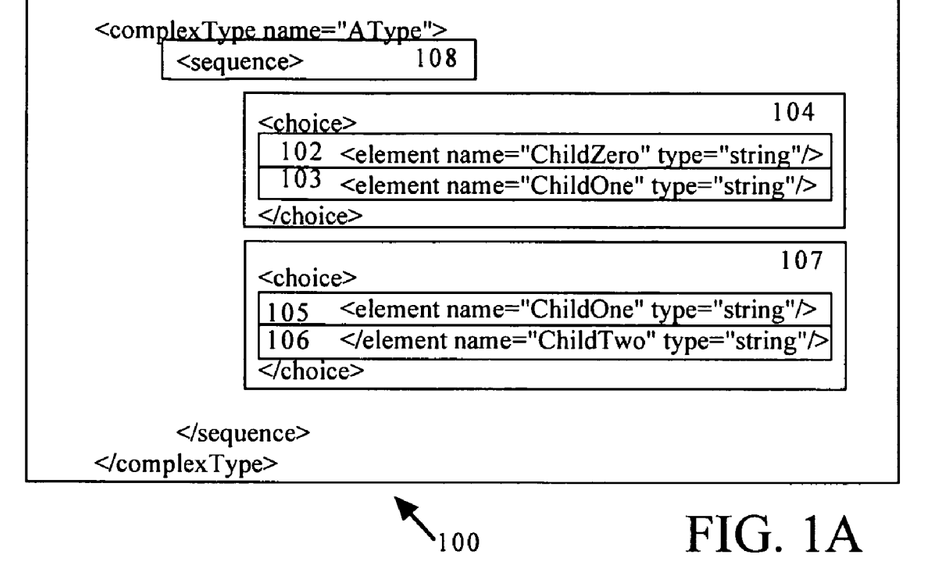
FIG. 1A is sample XML code that illustrates a complex type that declares a sequence content model in an XML schema.

Consider sample code 100 listed in FIG. 1A. Sample code 100 includes a complex type having the name "AType." Note that in this example, the complex type is part of a larger XML schema. Inside AType, sequence model 108 is defined. Moreover, delving into the contents of sequence model 108, two separate choice models 104 and 107 are also listed. Each of these two choice models (104 and 107) identifies two child elements, some of which are repeated. For example, as illustrated, the first choice content model 104 includes child elements ChildZero 102 and ChildOne 103. The second choice content model 107 includes a second ChildOne element 105 and a ChildTwo element 106. Here, ChildOne (103 and 105) is repeated in the choice content models. Conventionally, when this portion of the XML schema is registered with a database system, the database system would attempt to create a base database structure for the ChildOne element 103 and a separate base database structure for the second ChildOne element 105. To avoid inconsistencies, dual mappings, and object relational storage issues, the database system would set an error flag indicating that repeated elements in a complex type were encountered.

To resolve this problem, in one embodiment, the database system analyzes the XML schema to determine the maximum number of occurrences for each element in the schema. Generally, the maximum number of occurrences for an element is simply the defined or default value associated with a particular element. However, in the case of repeated elements, the maximum number may be higher. For example, suppose repeated elements in an XML schema include additional attributes that define the maximum number of times each particular instance of the element can occur. For example, in FIG. 1D, ChildOne element 131 has an attribute "maxOccurs=5" that indicates that it can occur a maximum number of 5 times. Also in FIG. 1D is repeated ChildOne element that has no specified attribute value, so it defaults to one as the maximum number of times it may occur in an instance XML document. Therefore, in this example, it is possible that an instance XML document includes a total of six separate values for the ChildOne element (e.g., five values based on first ChildOne element 131 and once for the second ChildOne element 132).

The database system detects the total maximum number of occurrences of a particular element and uses that value when creating base database structures. For example, when the base database structures for the XML schema associated with FIG. 1D is created, the base database structure for the ChildOne element is created to hold collections of 6 occurrences of the element ChildOne (e.g., the ChildOne base database structure is defined to includes lists, tables, or arrays corresponding to the number of occurrences of ChildOne elements in an instance XML document).

The process of determining the maximum number of occurrences is based in part on the type of content model used within a complex type. For example, if the content model is a sequence or all content model, then the total maximum number of occurrences for a particular element is simply the sum of all the maximum occurrence values for each instance of the element. For example, if there are three repeated elements each with a maxOccurs value of 3, then the total maximum number of occurrences for that particular element is 9 (e.g., 3+3+3), and the base structure associated with the element can be created to hold collections of nine element values.

If the XML schema includes a choice content model within a complex type, then the database system uses the highest maximum number of occurrences for an individual element as the total maximum number of occurrences. For example, suppose an XML schema includes two repeated child elements in a choice content model. One of the child elements has a maxOccurs value of 3 and the other has a maxOccurs value of 2. In this example, the database system uses the value of 3 as the total maximum number of occurrences for that particular child element since in a choice content model only one of the repeated elements will be included in instance XML documents.

Accordingly, the database system determines the total maximum number of occurrences for repeated elements. As noted above, if the total maximum number of occurrences is greater than one, then the object type (e.g., whether the base database structure should be of a scalar type of collection type) for the corresponding base database structure is a collection type. If the total maximum number of occurrences is 1, then the corresponding base database structure is created to store scalar values.

Once the object type of the column corresponding to the elements has been determined, the underlying storage for each column type may be allocated based on the determined maximum occurrence values.

Figure 2:
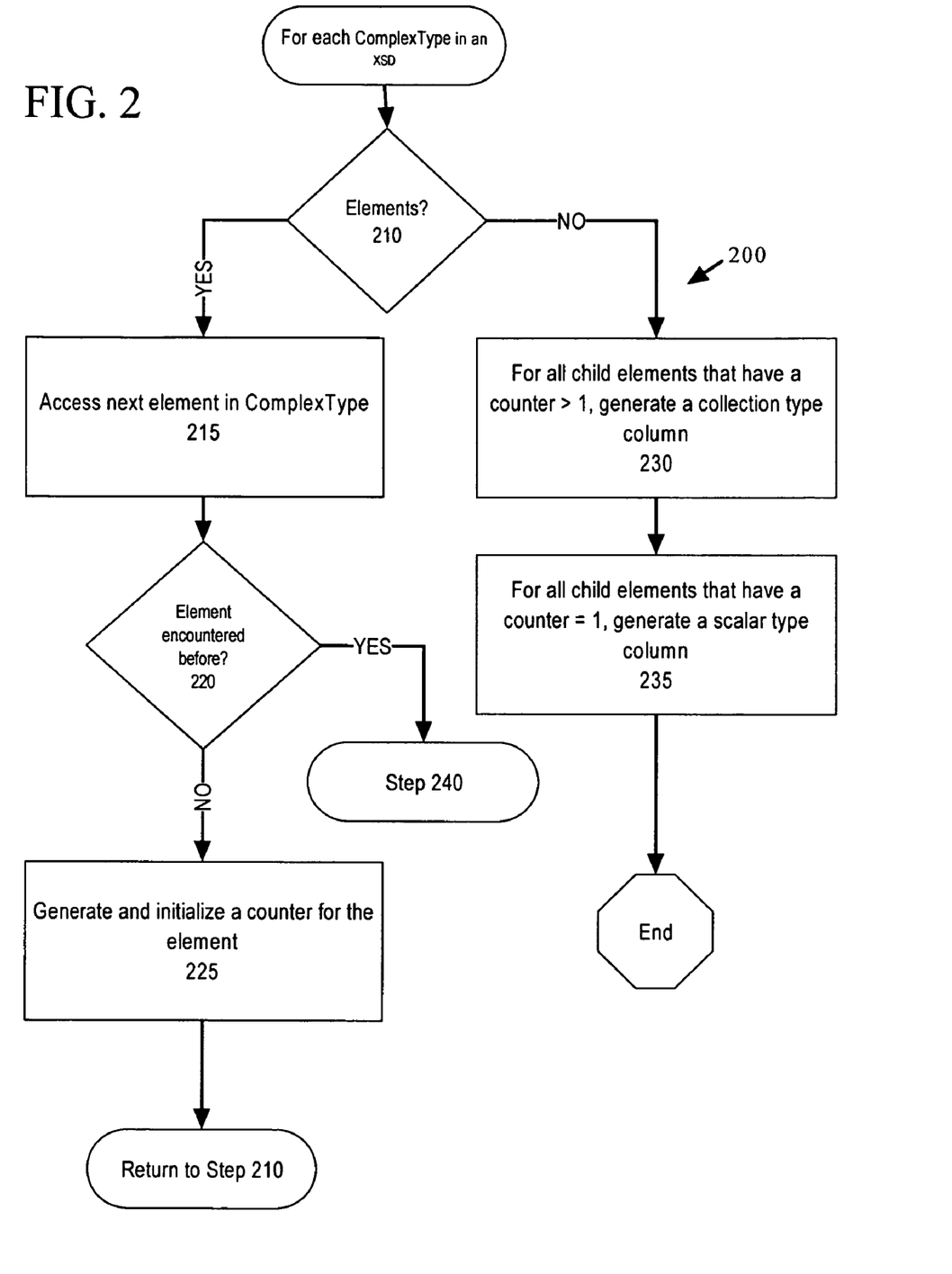
FIG. 2 is a flowchart illustrating steps performed to detect the repeated elements in a complex type in an XML schema document, according to an embodiment of the invention.

FIG. 2 is a flowchart 200 illustrating steps to overcome the problem of storing repeated elements within a complex type in an XML schema. At step 210, a database system receives as input an instance XML document and determines whether there are any complex types in the document and. If so, the database server then determines whether the complex type has any unevaluated elements. Suppose for example, an instance XML document containing the complex type shown in FIG. 1A is input to the database system. The XML code in FIG. 1A defines the complex type called "AType". AType contains four elements: "ChildZero"102, "ChildOne" 103, "ChildOne" 105, and "ChildTwo" 106.

Assume that the database system determines that the four listed elements have not yet been evaluated so the database system proceeds to the next step. At step 215, the database system accesses the first element in AType, ChildZero 102.

At step 220, ChildZero 102 is evaluated to determine if that particular element is a repeated element, e.g., whether ChildZero has been encountered before. In one embodiment, the database system can make this determination by maintaining a list of previously encountered elements for each complex type. Alternatively, the database system may use an array, table, stack, or other structure to keep track of elements. Here, since ChildZero 102 has not been encountered before, the database system adds ChildZero to its list for AType and continues.

In addition, at step 225, a counter is generated and initialized for ChildZero 102 in order to keep track of the number of times total maximum number of occurrences of the element. In one embodiment, the counter for ChildZero 102 is initialized to one. Alternatively, the counter is initialized to a specified maximum number of occurrences for the element. For example, if ChildZero has an attribute such as "maxOccurs=5," the counter is initialized to that maximum occurrence value, e.g., five. The counter is placed (or referenced) in the list of encountered elements. The database system then loops back to look for any other unevaluated elements listed in the complex type.

With reference to FIG. 1A, at step 210, the database system determines that there are still unevaluated elements in AType. Accordingly, at step 215, the database system accesses the next element, ChildOne 103, and checks to see if it has been encountered before at step 220. At step 225, the database system looks at its list of encountered elements and determines that ChildOne 103 has not been encountered before. Accordingly, the database system generates and initializes a counter for the ChildOne element. Since no maximum constraint is specified in the instruction, the counter for ChildOne 103 is set by default to one. Subsequently, the ChildOne counter is added to the list of encountered elements. The database system loops back to step 210.

On the third time through, at step 210, the database system again detects that there are unevaluated elements in the complex type. As a result, the database system accesses the next element to see if it has been encountered before. Here, it accesses the second ChildOne element 105 and determines, by consulting its previously encountered elements list, that it has encountered a previous element called ChildOne.

At step 245, the database system verifies that the second ChildOne element 105 and the first ChildOne element 103 are from the same complex type, AType, and are of the same type (e.g., they are both strings). If the two ChildOne elements are inconsistent, at step 252, an error is raised so the problem can be debugged (e.g., so one of the elements can be renamed).

In one embodiment, both ChildOne elements 103 and 105 are repeated elements from the same complex type. To avoid the problems of conventional XML schema registration mechanisms, at step 250, the database system attempts to find a minimal common ancestor for the ChildOne elements by walking back up the schema to find the first content model the two elements have in common. For example, in FIG. 1A, walking back up the schema both ChildOne elements have a common content model: "sequence" 108. Accordingly, sequence 108 is the minimal common ancestor.

At step 255, the database system determines what type of content model the minimal common ancestor is (e.g., choice, sequence, or all). In FIG. 1A, since the minimal common ancestor is "sequence," the database system proceeds to step 260. At step 260, the database system combines the number of maximum occurrences for the first ChildOne element 103 with the maximum number of occurrences for the second ChildOne element 105 and stores the sum in the corresponding counter for ChildOne. Therefore, if the maxOccurs attribute for the first ChildOne element is set at 2 and the maxOccurs attribute for the second ChildOne element is set at 5, the numbers are combined and the corresponding counter variable is set to 7.

The database system then loops back to step 210 and evaluates the next element in the schema, which is ChildTwo 106. ChildTwo 106 is an unencountered element, so the database system processes it in a manner similar to ChildZero 102.

After all the elements have been evaluated, at step 210, the database system determines what object types to assign to the base database structures associated with each element. In one embodiment, the database system makes the determination based in large part on the counter values created for each of the elements.

At step 230, for all child elements that have a counter value greater than 1, the database system generates a base database structure that stores collections of element values. The maximum number of elements that can be placed in any one entry of the base database then corresponds to the element's counter value. In other words, the object type for these child elements is a non-scalar value. For example, if the combined maximum number of occurrences for ChildOne elements is 7, the object type of its base database structure is a collection can column include up to 7 string values. Thus, when the database is created, the underlying storage may be tailored to accommodate the total maximum number of elements.

At step 235, in one embodiment, the database system generates a scalar type column for child elements with a counter value equal to one.

In this way, the underlying storage on disk for the object relational repository supports repeated elements in a complex type.

Figure 1B:
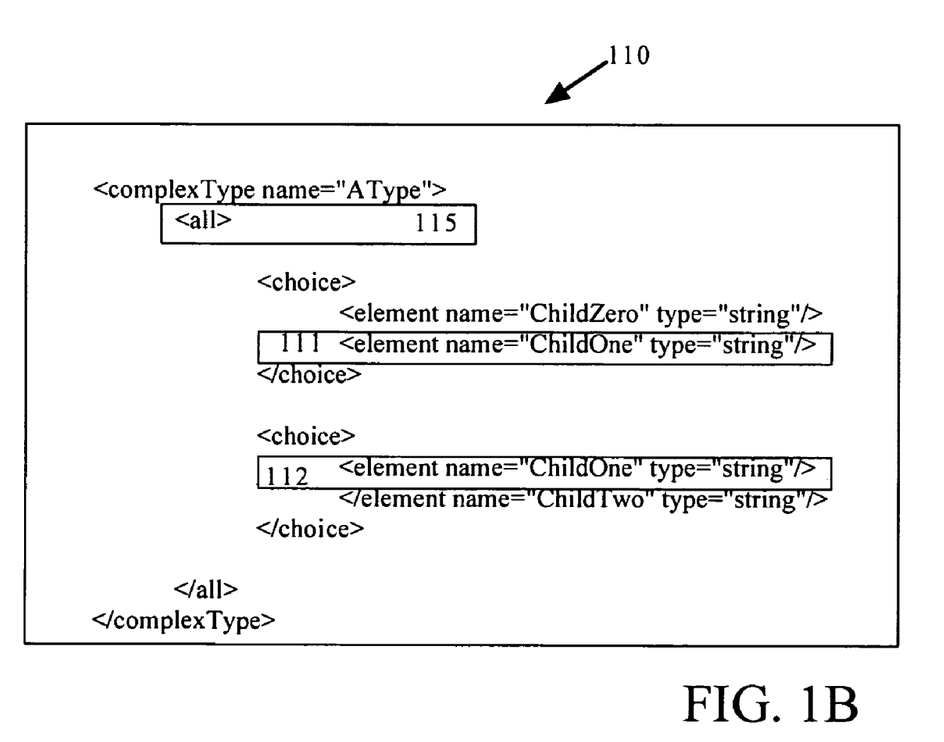
FIG. 1B is sample XML code that illustrates a complex type that declares an all content model in an XML schema.

As another example, FIG. 1B illustrates sample code 110 for an XML complex type that includes an "all" content model as the minimal common ancestor for repeated ChildOne elements 111 and 112. In one embodiment, the evaluation of sample code 110 results in similar analysis to that performed in conjunction with FIG. 1A. When the database system evaluates the code, it detects the repeated ChildOne elements 111 and 112. Accordingly, at step 255, the database system determines that the minimal common ancestor is "all." At step 260, the database system combines the maximum occurrences of the first ChildOne element 111 with the maximum number of occurrences of the second ChildOne element 112. Since the all content model only supports a maximum of one occurrence for sub-element in the XML schema, the first ChildOne element 111 and second ChildOne element 112 each can occur only once. Thus, the total maximum number of occurrences is two. That value is assigned to the corresponding counter in the list of encountered elements.

Then, when the XML schema has been fully evaluated, the base database structure for the ChildOne element is created as a collection type with a maximum value of two. Then, when instance XML documents are inserted into the database, storage on disk is allocated to accommodate the defined object type.

Figure 1C:
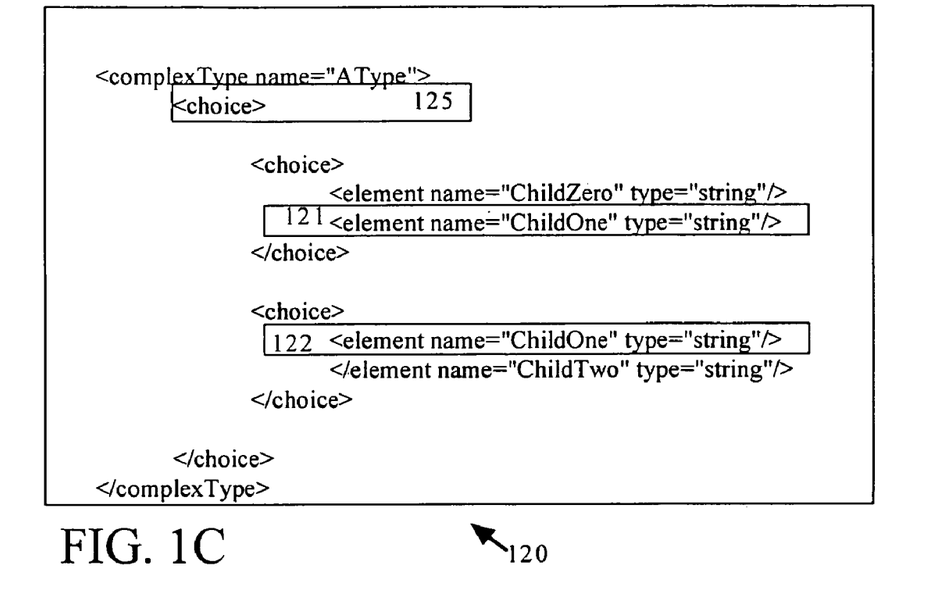
FIG. 1C is sample XML code that illustrates a complex type that declares a choice content model in an XML schema.
Figure 1D:
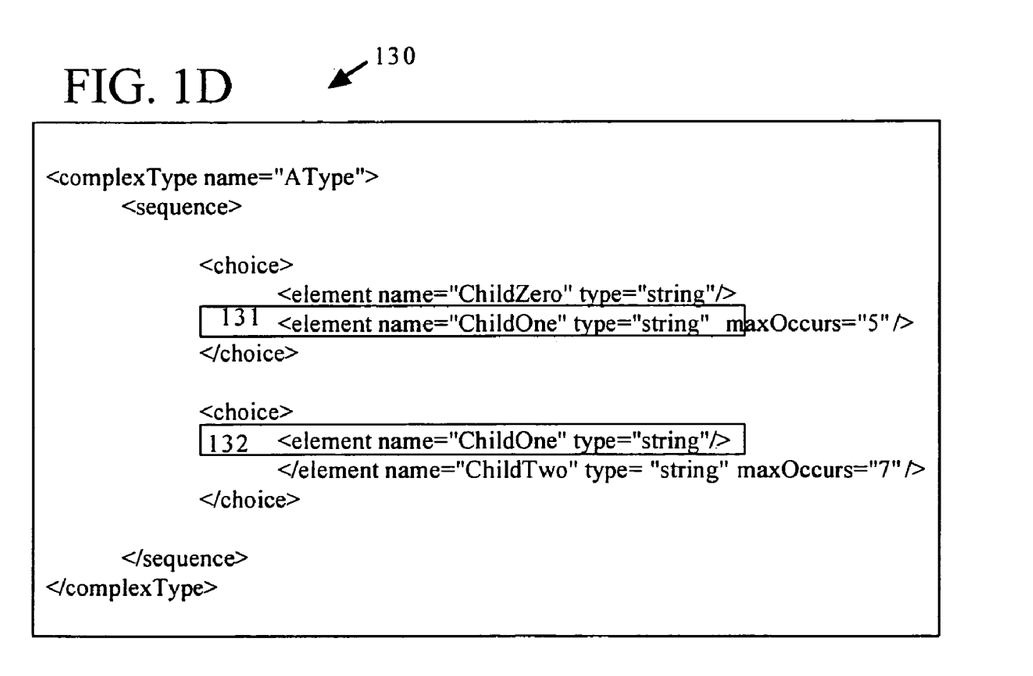
FIG. 1D is sample XML code that illustrates a complex type that includes limits on defined elements in an XML schema.

FIG. 1C illustrates sample code 120 for an XML complex type that includes a "choice" content model. In one embodiment, the evaluation of the choice content model proceeds in substantially the same way as the other two content models. The evaluation process diverges at step 255, when the database system finds choice as the minimal common ancestor. In this instance, the database system proceeds to step 265, where the database system analyzes the repeated ChildOne elements 121 and 122 to determine which has a greater maximum occurrence value. The greater value is set to the counter value for the ChildOne element.

In one embodiment, selecting the higher value in a choice content model is done because only one of the repeated elements in a choice content model may occur in any instance XML document. Thus, selecting the higher maximum occurrence value of the element listings ensures enough storage space is allocated for the ChildOne element. For example, a maxOccurs attribute for the first ChildOne element 121 is set at 5 and the maxOccurs attribute for the second ChildOne element 122 is set at 7. The resulting object type for the base database structure corresponding to the ChildOne elements is a collection type with seven entries corresponding to the maximum possible number of occurrences of values for any individual ChildOne element.

Once the XML schema definition has been evaluated and registered, instance documents conforming to the schema may be stored in the database.

Registration of Repeated Elements in a Parent/Child Type

Figure 1E:
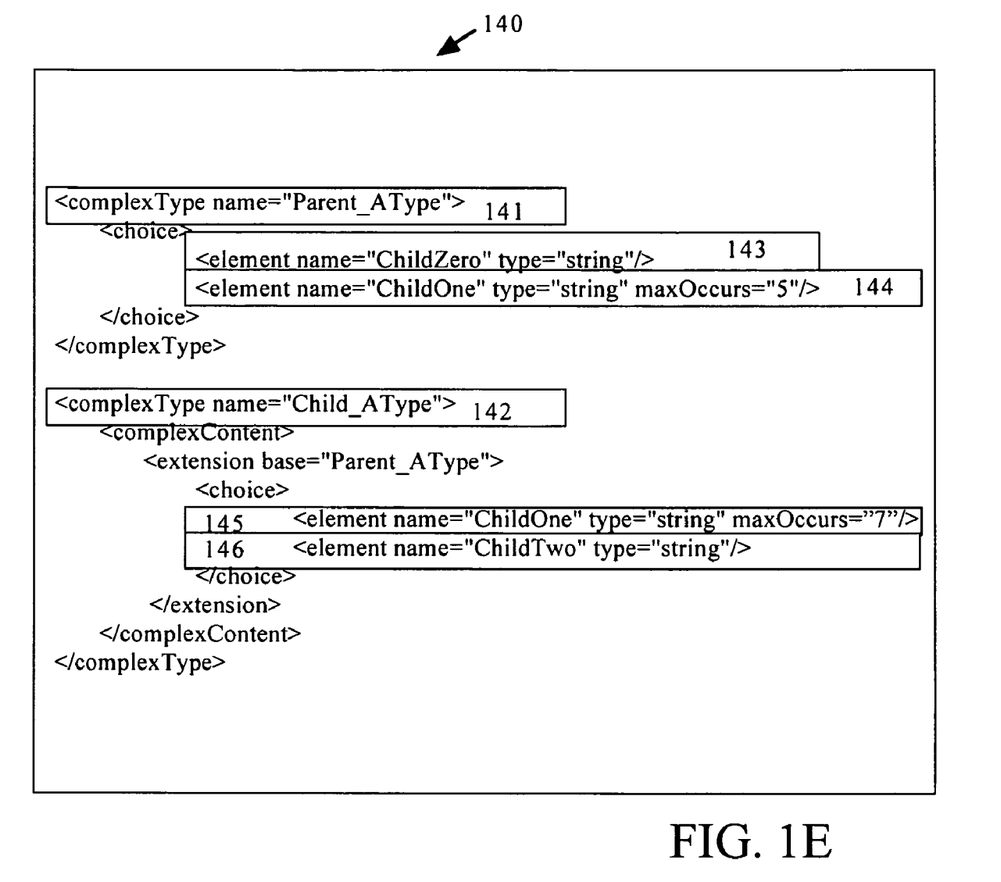
FIG. 1E is sample XML code that illustrates a complex type having an extension in an XML schema.

In one embodiment, a complex type may also be an extended type, inheriting the elements and attributes of a parent complex type. FIG. 1E illustrates sample code 140 where a complex type called Child_AType 142 is an extension of Parent_AType 141. Parent_AType lists only two elements ChildZero 143 and ChildOne 144. Neither one is a repeated element. At first glance, it also appears that Child_AType 142 has no repeated elements. Its only elements are ChildOne 145 and ChildTwo 146. However, since Child_AType is an extension of the Parent_AType, it inherits the elements of Parent_AType. Consequently, when the XML schema is registered, the internal representation of Child_AType includes not only its ChildOne 145 and ChildTwo 146 elements, but also elements ChildZero 143 and ChildOne 144 from the parent. Accordingly, the database system detects repeated ChildOne elements 144 and 145 and evaluates the elements in a manner similar to that described above in connection with FIG. 2.

In one embodiment, the database system detects the inherited repeated elements and sums the maximum number of occurrences for each repeated element in the child type. That sum is a factor in determining how to allocate storage for a particular element in the database and on disk. For example, in FIG. 1E, Child_AType 142 includes, through inheritance, repeated ChildOne elements 144 and 145. To determine the object type of the base database structure corresponding to the ChildOne element, the maxOccurs value for both ChildOne elements are combined. In FIG. 1E, the maxOccurs value for the parent ChildOne element 144 is five, and the maxOccurs value for the child ChildOne element 145 is seven. Together, a total of twelve ChildOne element values may occur in any instance XML document. Hence, the base database structure for the ChildOne element will be of a collection type capable of storing up to twelve elements.

In parent/child embodiments, it is not necessary to determine a minimal common ancestor since every element in the parent is automatically repeated in the child.

Evolving a Schema After Registration

At some point after an XML schema has been registered, the object relational repository for the schema created, and instance documents inserted in the repository, a user may decide to change the original schema. The process of changing an XML schema after it has been registered is called evolution. Evolving a schema involves adding elements, removing elements, making changes to existing elements, or performing a combination of such factors to the schema.

Referring again to FIG. 1A, suppose that after the XML schema including AType has been registered, a user realizes they need to add a new element, ChildTwo, to "choice" instruction 104. In one embodiment, a schema evolution operation to create the new ChildTwo element also introduces a repeated element into the schema. Basically, the schema evolution operation creates a duplicate ChildTwo 106.

Accordingly, in one embodiment, the database system detects that the evolution operation will create duplicate ChildTwo elements. Assume that the base database structure for the ChildTwo element was originally created as a scalar type. Introducing the repeated element affects the structure of the associated database.

For example, unless an error is detected, after the schema evolution is performed, an instance XML document may now include two separate ChildTwo listings, and each listing may occur at least once. Therefore, the underlying storage for the ChildTwo element needs to be able to store the total maximum number of occurrences of ChildTwo. Accordingly, the underlying storage for ChildTwo needs to evolve from a scalar type to a collection type that stores at least two ChildTwo values.

For example, in the original schema, ChildTwo 106 is of a string type, so the base database structure for ChildTwo values is a scalar string type. By evolving the schema, the total maximum number of occurrences of ChildTwo values increases to two. In one embodiment, the database and how it is stored need to be modified to handle the additional string.

There are a variety of different ways the database system may handle storage of data after the evolution operation (and the corresponding in base database structure's object type). Each technique has tradeoffs. In one embodiment, a user may determine which technique to use based on their specific circumstances and system requirements.

The first technique to handle storage of data after the change in an elements object type is a "brute force" technique. According to the brute force technique, the database system copies out all the data from the original ChildTwo base database structure, deletes the old scalar-type base database structure, creates a new non-scalar-type base database structure, and copies the data back into the new base database structure. Essentially, in this example, a base database structure that holds a scalar string type is replaced with a new base database structure that holds a collection type (e.g., varray[5]) of five strings. Depending on the amount of data, this process may be very resource expensive (e.g., the process of copying out an entire base database structure and copying the data back in is time consuming and risks the loss of data). In addition, in some cases, evolution operations may be made on more than one base database structure, which means even more data may be copied out and copied back in after a schema evolution operation has been performed. Thus, the downtime and potential loss of data that accompany the brute force technique may not be acceptable in high availability situations.

In an embodiment, instead of using a brute force technique to update the storage for an evolved schema, the database system may simply create a second base database structure into which it can store the additional element values. For example, a second base database structure may be added to a database called ChildTwo_Collection. ChildTwo_Collection is of a collection type that stores four ChildTwo values. This technique may introduce a slight bit of overhead to the system, since a query may now read two base database structures to find requested data and since some mapping overhead information may be stored to indicate that both those base database structures map to the same elements. Alternatively, other mechanisms may be added to maintain both base database structures. In any event, the additional base database structure and overhead associated with a second base database structure may have a slight effect on indexing and querying, but this technique avoids the downtime and potential loss of data that the brute force technique engenders. Note that the renaming of the base database structure may be done internally to avoid any confusion with the original ChildTwo base database structure.

Similar techniques may be used when a maxOccurs attribute value is modified or updated. In an embodiment, a database system administrator can choose which of these techniques (or even other techniques) meets their particular system needs.

In one embodiment, an element can be removed from an XML schema. For example, after adding a new ChildTwo element to the sample code 100 in FIG. 1A, assume the database administrator decides to remove it. This operation changes the underlying storage of data because the total maximum number of occurrences ChildTwo has been reduced from two to one.

To efficiently handle the change in the schema, in one embodiment, a second base database structure, like the one described in the example above where a new base database structure is added for the evolved schema, is deleted. Alternatively, a brute force technique may be used to copy data from the collection type base database structure(s) out, delete the old base database structure(s), add a new base database structure with the appropriate object type, and copy the data back into the new base database structure. The advantages and disadvantages of this technique are similar to those as described above. Specifically, the process of copying data in and out is time consuming, which means there may be significant down time. Moreover, there is a greater risk for loss of data.

An alternative technique for managing the underlying storage when a repeated element is removed is to internally truncate the affected base database structure(s). For example, when the number of occurrences for an element is reduced from five to one, a database system's internal logic may be set to only recognize the first listed value in a base database structure's stored collection. Similarly, if the number of occurrences is reduced from five three, a different constraint (e.g., 3) may be placed on the base database structure to internally truncate the stored collection types. The tradeoff to such a technique is the potential for wasting storage space. Accordingly, a database system administrator may choose which of these techniques or other techniques meets their particular system needs.

These techniques allow a database system to handle repeated elements gracefully, both as new schemas are registered, and as schemas are evolved to introduce or remove this construct.

Hardware Overview

Figure 3:
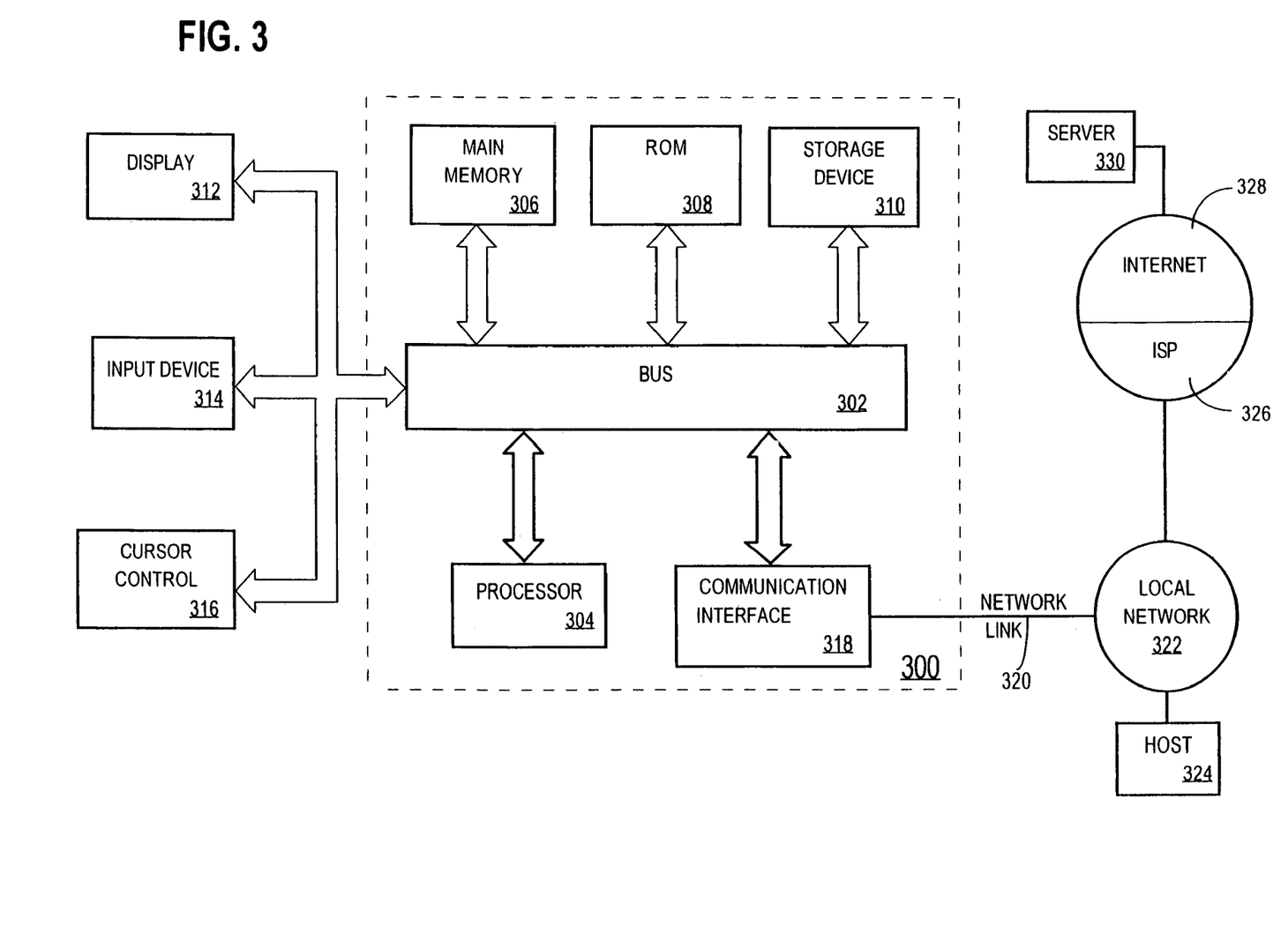
FIG. 3 is a block diagram of a computer system upon which embodiments of the invention may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one implementation of the invention, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative implementations, hard-wired circuitry may be used in place of or in combination with software instructions to implement the invention. Thus, implementations of the invention are not limited to any specific combination of hardware circuitry and software.

The term "machine-readable medium" as used herein refers to any medium that participates in providing data that causes a machine to operation in a specific fashion. In an implementation implemented using computer system 600, various machine-readable media are involved, for example, in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

In the foregoing specification, implementations of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for creating a database structure to store repeated elements in a complex type of an XML schema comprising:

accessing a first schema instance of a first element type in the complex type of the XML schema;

finding one or more additional schema instances of the first element type in the complex type of the XML schema;

determining a total maximum number of occurrences value based on a maximum occurrence value for the first schema instance and a maximum occurrence value for each additional schema instance of the one or more additional schema instances, wherein the total maximum number of occurrences value is a maximum number of times a document element of the first element type is allowed to occur in any XML document that conforms to the XML schema;

selecting a base database structure type based on the total maximum number of occurrences; and creating a base database structure for the first element type, wherein the base database structure is of said selected base database structure type;

wherein determining the total maximum number of occurrences value includes at least one of:

generating a counter value associated with the first element type, wherein generating the counter value associated with the first element type includes combining the maximum occurrence value for the first schema instance and the maximum occurrence value for each of the one or more additional schema instances, or selecting a highest value of the maximum occurrence value for the first schema instance and the maximum occurrence value for each of the one or more additional schema instances;

wherein the method is performed by one or more computing devices.

2. The method of claim 1, wherein finding the one or more additional schema instances is based on whether the first schema instance and the one or more additional schema instances have a same name.

3. The method of claim 1, further comprising finding a minimal common ancestor for the first schema instance and the one or more additional schema instances within the complex type.

4. The method of claim 3, wherein finding the minimal common ancestor includes walking up the XML schema to find a common content model.

5. The method of claim 3, wherein the minimal common ancestor is one of a sequence content model and an all content model.

6. The method of claim 1, wherein determining the total maximum number of occurrences value includes generating the counter value associated with the first element type, wherein generating the counter value associated with the first element type includes combining the maximum occurrence value for the first schema instance and the maximum occurrence value for each of the one or more additional schema instances.

7. The method of claim 3, wherein the minimal common ancestor is a choice content model.

8. The method of claim 7, wherein determining the total maximum number of occurrences value includes selecting a highest value of the maximum occurrence value for the first schema instance and the maximum occurrence value for each of the one or more additional schema instances.

9. The method of claim 6, further comprising creating a storage structure in an object relational repository for the first element type, wherein an object type for the storage structure is determined based in part on the counter value.

10. The method of claim 9, wherein if the total maximum number of occurrences value is greater than one, the object type is a non-scalar value.

11. The method of claim 9, wherein if the total maximum number of occurrences value is one, the object type is a scalar value.

12. The method of claim 1, wherein finding one or more additional schema instances of the first element type in the complex type includes evaluating a set of schema instances from a parent complex type.

13. The method of claim 9, further comprising:

adding to the complex type in the XML schema a third schema instance, wherein the third schema instance is a same type of element as the first schema instance:

evolving the complex type in the XML schema to add the third schema instance;

computing a new counter value based on the maximum occurrence value for the first schema instance and the maximum occurrence value for the third schema instance; and modifying the object type of the storage structure based on the new counter value.

14. The method of claim 13, wherein the storage structure includes a first column to store a first set of document element values conforming to the object type and a second column to store a second set of document element values determined after evolving the complex type in the XML schema;

wherein the first set and the second set of document element values occur in one or more XML documents that conform to the XML schema.

15. The method of claim 9, further comprising:

devolving the complex type in the XML schema to remove one or more additional schema instances;

computing a new counter value based on the maximum occurrence value for said one or more additional schema instances; and modifying the object type of the storage structure based on the new counter value.

16. The method of claim 15, wherein modifying the object type of the storage structure based on the new counter value includes truncating a number of the document element values in the object type to equal to the new counter value.

17. The method of claim 1, wherein the method further includes:

in response to accessing the first schema instance, adding the first schema instance to a set of previously encountered schema instances; and finding one or more additional schema instances of the first element type includes consulting the set of previously encountered schema instances.

18. A storage device storing one or more sequences of instructions which, when executed by one or more processors, causes the one or more processors to perform: accessing a first schema instance of a first element type in a complex type of an XML schema;

finding one or more additional schema instances of the first element type in the complex type of the XML schema;

determining a total maximum number of occurrences value based on a maximum occurrence value for the first schema instance and a maximum occurrence value for each additional schema instance of the one or more additional schema instances, wherein the total maximum number of occurrences value is a maximum number of times a document element of the first element type is allowed to occur in any XML document that conforms to the XML schema;

selecting a base database structure type based on the total maximum number of occurrences; and creating a base database structure for the first element type, wherein the base database structure is of said selected base database structure type;

wherein determining the total maximum number of occurrences value includes at least one of:

generating a counter value associated with the first element type, wherein generating the counter value associated with the first element type includes combining the maximum occurrence value for the first schema instance and the maximum occurrence value for each of the one or more additional schema instances, or selecting a highest value of the maximum occurrence value for the first schema instance and the maximum occurrence value for each of the one or more additional schema instances.

19. The storage device of claim 18 wherein finding the one or more additional schema instances is based on whether the first schema instance and the one or more additional schema instances have a same name.

20. The storage device of claim 18 said one or more sequences of instructions which, when executed by one or more processors, further cause the one or more processors to perform:

finding a minimal common ancestor for the first schema instance and the one or more additional schema instances within the complex type.

21. The storage device of claim 20, wherein finding the minimal common ancestor includes walking up the XML schema to find a common content model.

22. The storage device of claim 20, wherein the minimal common ancestor is one of a sequence content model and an all content model.

23. The storage device of claim 18, wherein determining the total maximum number of occurrences value includes generating a counter value associated with the first element type, wherein generating the counter value associated with the first element type includes combining a maximum occurrence value for the first schema instance and a maximum occurrence value for each of the one or more additional schema instances.

24. The storage device of claim 20, wherein the minimal common ancestor is a choice content model.

25. The storage device of claim 24, wherein determining the total maximum number of occurrences value includes selecting a highest value of a maximum occurrence value for the first schema instance and a maximum occurrence value for each of the one or more schema additional instances.

26. The storage device of claim 23, said one or more sequences of instructions which, when executed by one or more processors, further cause the one or more processors to perform:

creating a storage structure in an object relational repository for the first element type, wherein an object type for the storage structure is determined based in part on the counter value.

27. The storage device of claim 26, wherein if the total maximum number of occurrences value is greater than one, the object type is a non-scalar value.

28. The storage device of claim 26, wherein if the total maximum number of occurrences value is one, the object type is a scalar value.

29. The storage device of claim 18, wherein finding one or more additional schema instances of the first element type in the complex type includes evaluating a set of schema instances from a parent complex type.

30. The storage device of claim 26, wherein when a third schema instance is to be added to the complex type in the XML schema, wherein the third schema instance is a same type of element as the first schema instance:

evolving the complex type in the XML schema to add the third schema instance;

computing a new counter value based on the maximum occurrence value for the first schema instance and the maximum occurrence value for the third schema instance; and modifying the object type of the storage structure based on the new counter value.

31. The storage device of claim 30, wherein the storage structure includes a first column to store a first set of document element values conforming to the object type and a second column to store a second set of document element values determined after evolving the complex type in the XML schema;

wherein the first set and the second set of document element values occur in one or more XML documents that conform to the XML schema.

32. The storage device of claim 26, said one or more sequences of instructions which, when executed by one or more processors, further cause the one or more processors to perform:

devolving the complex type in the XML schema to remove one or more additional schema instances;

computing a new counter value based on the maximum occurrence value for said one or more additional schema instances; and modifying the object type of the storage structure based on the new counter value.

33. The storage device of claim 32, wherein modifying the object type of the storage structure based on the new counter value includes truncating a number of the document element values in the object type to equal to the new counter value.

34. The storage device of claim 18, said one or more sequences of instructions which, when executed by one or more processors, further cause the one or more processors to perform:

in response to accessing the first schema instance, adding the first schema instance to a set of previously encountered schema instances; and finding one or more additional schema instances of the first element type includes consulting the set of previously encountered schema instances.

* * * * *

UNITED STATES PATENT AND TRADEMARK OFFICE
CERTIFICATE OF CORRECTION

| | | |
|---|---|---|
| PATENT NO. | : 7,761,479 B2 | Page 1 of 1 |
| APPLICATION NO. | : 11/519720 | |
| DATED | : July 20, 2010 | |
| INVENTOR(S) | : Abhyudaya Agrawal et al. | |

It is certified that error appears in the above-identified patent and that said Letters Patent is hereby corrected as shown below:

In column 1, line 6-7, delete "appplication" and insert -- application --, therefor.

In column 1, line 15, delete "TN" and insert -- IN --, therefor.

In column 15, line 11, in claim 19, delete "claim 18" and insert -- claim 18, --, therefor.

In column 15, line 16, in claim 20, delete "claim 18" and insert -- claim 18, --, therefor.

Signed and Sealed this
Twenty-sixth Day of April, 2011

David J. Kappos
*Director of the United States Patent and Trademark Office*